United States Patent
Staub et al.

(10) Patent No.: US 11,346,759 B2
(45) Date of Patent: May 31, 2022

(54) SYSTEM FOR TESTING BLADE SHARPNESS

(71) Applicant: ANAGO LIMITED, Hamilton (NZ)

(72) Inventors: Tim Staub, Hamilton (NZ); Peter Dowd, Hamilton (NZ)

(73) Assignee: Anago Limited, Hamilton (NZ)

( * ) Notice: Subject to any disclaimer, the term of this patent is extended or adjusted under 35 U.S.C. 154(b) by 141 days.

(21) Appl. No.: 16/104,724

(22) PCT Filed: Feb. 9, 2017

(86) PCT No.: PCT/NZ2017/050012
§ 371 (c)(1),
(2) Date: Aug. 17, 2018

(87) PCT Pub. No.: WO2017/142423
PCT Pub. Date: Aug. 24, 2017

(65) Prior Publication Data
US 2019/0277741 A1 Sep. 12, 2019

(30) Foreign Application Priority Data
Feb. 19, 2016 (NZ) ........................ 717208

(51) Int. Cl.
*G01N 3/58* (2006.01)
*B23Q 17/09* (2006.01)
*G01N 3/08* (2006.01)

(52) U.S. Cl.
CPC .............. *G01N 3/58* (2013.01); *B23Q 17/09* (2013.01); *G01N 3/08* (2013.01); *G01N 2203/0032* (2013.01); *G01N 2203/0676* (2013.01)

(58) Field of Classification Search
CPC .... G01N 3/58; G01N 3/08; G01N 2203/0032; G01N 2203/0676; B23Q 17/09
(Continued)

(56) References Cited

U.S. PATENT DOCUMENTS 5,115,403 A * 5/1992 Yoneda ................ B23D 55/088
702/41
5,379,633 A * 1/1995 Flisram ................ G01L 5/0028
73/104
(Continued)

FOREIGN PATENT DOCUMENTS

DE  10 2011 170 7201        1/2013
DE     102019007471 A1 *    4/2020
(Continued)

OTHER PUBLICATIONS

Anagoltd: "Anago Knife Sharpness Tester", May 26, 2015 (May 26, 2015), pp. 1-4, XP054979521, Retrieved from the Internet: URL:https://www.youtube.com/watch?v=pLcJB6YawJc—Jul. 10, 2019.
(Continued)

*Primary Examiner* — Nimeshkumar D Patel
*Assistant Examiner* — Gedeon M Kidanu
(74) *Attorney, Agent, or Firm* — Emerson Thomson Bennett; Daniel A. Thomson

(57) ABSTRACT

A system for testing blade sharpness comprises a mounting arrangement for mounting a material to be cut; a force measuring device operable, in use, to determine variations in force along a blade as parts of the blade contact the material; and a control system. The control system is adapted to receive a signal that a blade sharpness test is to be performed; in response to the signal, prepare the mounting arrangement for a blade sharpness test; detect when force on the material rises above a pre-determined level; detect when the blade sharpness test is completed; and provide an indication of the force of the blade on the material.

14 Claims, 4 Drawing Sheets

(58) Field of Classification Search
USPC .................................................. 73/104, 105
See application file for complete search history.

(56) References Cited

U.S. PATENT DOCUMENTS

| | | | | |
|---|---|---|---|---|
| 5,438,863 | A * | 8/1995 | Johnson | G01N 33/445 73/54.02 |
| 5,506,786 | A * | 4/1996 | Itoh | B23Q 11/0042 73/660 |
| 5,568,028 | A * | 10/1996 | Uchiyama | G05B 19/4163 318/434 |
| 5,571,956 | A * | 11/1996 | Sargent | G01N 3/58 73/104 |
| 5,631,851 | A * | 5/1997 | Tanaka | G05B 19/4062 702/33 |
| 7,293,451 | B2 * | 11/2007 | Dowd | G01N 3/58 73/105 |
| 8,047,069 | B2 * | 11/2011 | Coulter | G01N 3/58 73/159 |
| 8,294,403 | B2 * | 10/2012 | Haas | G05B 19/406 318/473 |
| 9,962,843 | B2 * | 5/2018 | Gester | G01L 5/0033 |
| 10,551,288 | B2 * | 2/2020 | Dowd | G01N 3/58 |
| 10,599,123 | B2 * | 3/2020 | Kurosumi | G05B 19/182 |
| 11,092,527 | B1 * | 8/2021 | Graves | G01N 3/58 |
| 2002/0005098 | A1 * | 1/2002 | Drenguis | B26D 7/12 83/13 |
| 2006/0201237 | A1 * | 9/2006 | Dowd | G01N 3/58 73/104 |
| 2007/0107376 | A1 | 5/2007 | Konno | |
| 2010/0300195 | A1 * | 12/2010 | Coulter | G01N 3/58 73/159 |
| 2012/0090390 | A1 | 4/2012 | Bell et al. | |
| 2013/0186190 | A1 | 7/2013 | Newell et al. | |
| 2013/0218321 | A1 * | 8/2013 | Miyamoto | B23K 26/03 700/166 |
| 2018/0313731 | A1 * | 11/2018 | Dowd | G01L 5/0061 |
| 2018/0321119 | A1 * | 11/2018 | Yin | G01N 3/58 |

FOREIGN PATENT DOCUMENTS

| | | | |
|---|---|---|---|
| JP | 2013 205 138 | 10/2013 | |
| JP | 2013205138 A * | 10/2013 | |
| WO | WO-2014079889 A1 * | 5/2014 | ............... G01N 3/58 |
| WO | WO2014079889 A1 | 5/2014 | |

OTHER PUBLICATIONS

Anagoltd: "Running a test with your Anago Knife Sharpness Tester", Mar. 31, 2015 (Mar. 31, 2015), pp. 1-3, XP054979520 Retrieved from the Internet: URL:https://www.youtube.com/watch?v=uAYeoWY2DNo—Jul. 10, 2019.

* cited by examiner

SYSTEM FOR TESTING BLADE SHARPNESS

FIELD OF INVENTION

A preferred form of the invention relates to a system for testing the sharpness of a blade.

BACKGROUND

Devices for testing blade sharpness are known. One such device is described in U.S. Pat. No. 7,293,451 to Peter Dowd and is incorporated herein by reference. This device has a blade holder and a mounting arrangement for mounting a material to be cut. The blade holder is mounted on a carriage that, in use, moves the blade to contact the material. A measuring device measures the force required by the blade to cut the material. At all times the position of the blade is known as the location of the carriage (on which the blade is mounted) is recorded by way of a linear distance measurement device and sent to a microprocessor. The extent to which the blade has moved through the material is matched with the force measured by the gauge. It is not possible to use this device to measure the sharpness of a blade unless it is held by the carriage.

It is the object of the present invention to provide a system for testing the sharpness of a blade or to at least provide a useful choice.

The term "comprising", if and when used in this document, should be interpreted non-exclusively. For example, if used in relation to a combination of features it should not be taken as precluding the option of there being further unnamed features.

SUMMARY OF THE INVENTION

In broad terms in one aspect the invention comprises a system for testing blade sharpness comprising:
  a mounting arrangement for mounting a material to be cut;
  a force measuring device operable, in use, to determine variations in force along a blade as parts of the blade contact the material;
  a control system adapted to:
    receive a signal that a blade sharpness test is to be performed;
    in response to the signal, prepare the mounting arrangement for a blade sharpness test;
    detect when force on the material rises above a pre-determined level;
    detect when the blade sharpness test is completed; and
    provide an indication of the force of the blade on the material.

Optionally the control system is adapted to abort the test if pre-determined force levels are exceeded.

Optionally the control system receives the signal that a blade sharpness test is to be performed from a blade controller independent of the blade sharpness testing system.

Optionally the control system is adapted to send and receive signals from a blade controller.

Optionally the control system is adapted to receive position information from the blade controller.

Optionally the control system provides the indication of force on the blade as a peak sharpness measure.

In broad terms in another aspect the invention comprises a method of controlling a blade sharpness testing system comprising the steps of:
  receiving a signal that a blade sharpness test is to be performed;
  in response to the signal, preparing a mounting arrangement on the blade sharpness testing system for a blade sharpness test;
  detecting when force on a material to be cut of the blade sharpness testing system rises above a pre-determined level;
  detecting when the blade sharpness test is completed; and
  providing an indication of the force of the blade on the material.

Optionally the method further includes the step of aborting the test if pre-determined force levels are exceeded.

Optionally the step of receiving a signal that a blade sharpness test is to be performed comprises receiving the signal from a blade controller independent of the blade sharpness testing system.

Optionally the method further includes the steps of sending and receiving signals from a blade controller.

Optionally the method further includes the step of receiving position information from the blade controller.

Optionally the method further includes the step of providing an indication of force on the blade as a peak sharpness measure.

DRAWINGS

In the following more detailed description of the invention according to one preferred embodiment reference will be made to the accompanying drawings in which.

DETAILED DESCRIPTION

Some preferred forms of the invention will now be described by way of example. It should be understood that these are not intended to limit the scope of the invention but rather to illustrate optional embodiments.

Figure 1:
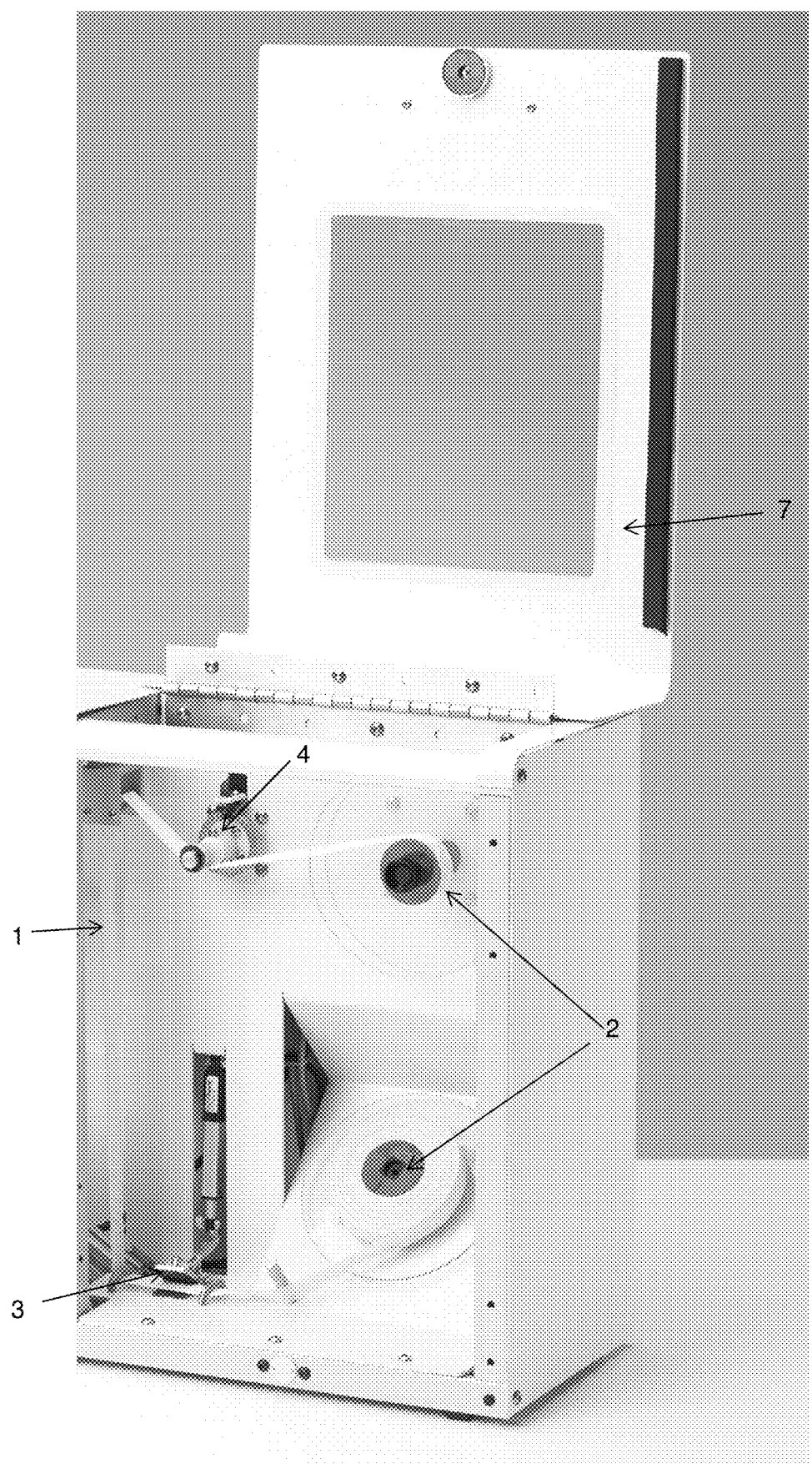
FIG. 1 is a front view of a housing and mounting arrangement for the material to be cut and force measuring means.

FIG. 1 shows a system for testing blade sharpness. In FIG. 1, the system has a housing containing a mounting arrangement for a material to be cut 1 and force measuring device. Some embodiments may not have the housing. The mounting arrangement comprises two spools 2 between which the material 1 is mounted. The material to be cut may be a strip material. Each spool 2 may be powered so that tension can be applied to the strip material 1. The strip material may be tensioned between an anchor 3 and a force measuring device (for example, a load cell 4). The load cell 4 measures the force on the strip material. Any other suitable force measuring device could also be used, for example, a strain gauge. Before a blade sharpness test is carried out the strip material is tensioned to a predetermined force. For example, the strip material may be tensioned to a force of 2 kg.

The material to be cut may be a mesh strip with a plurality of independent lines spanning the width of the strip. In other embodiments, the material may be any suitable material including animal tissue. The material may be the same as, or representative of, the material which the blade will be used, in normal use, to cut.

Figure 2:
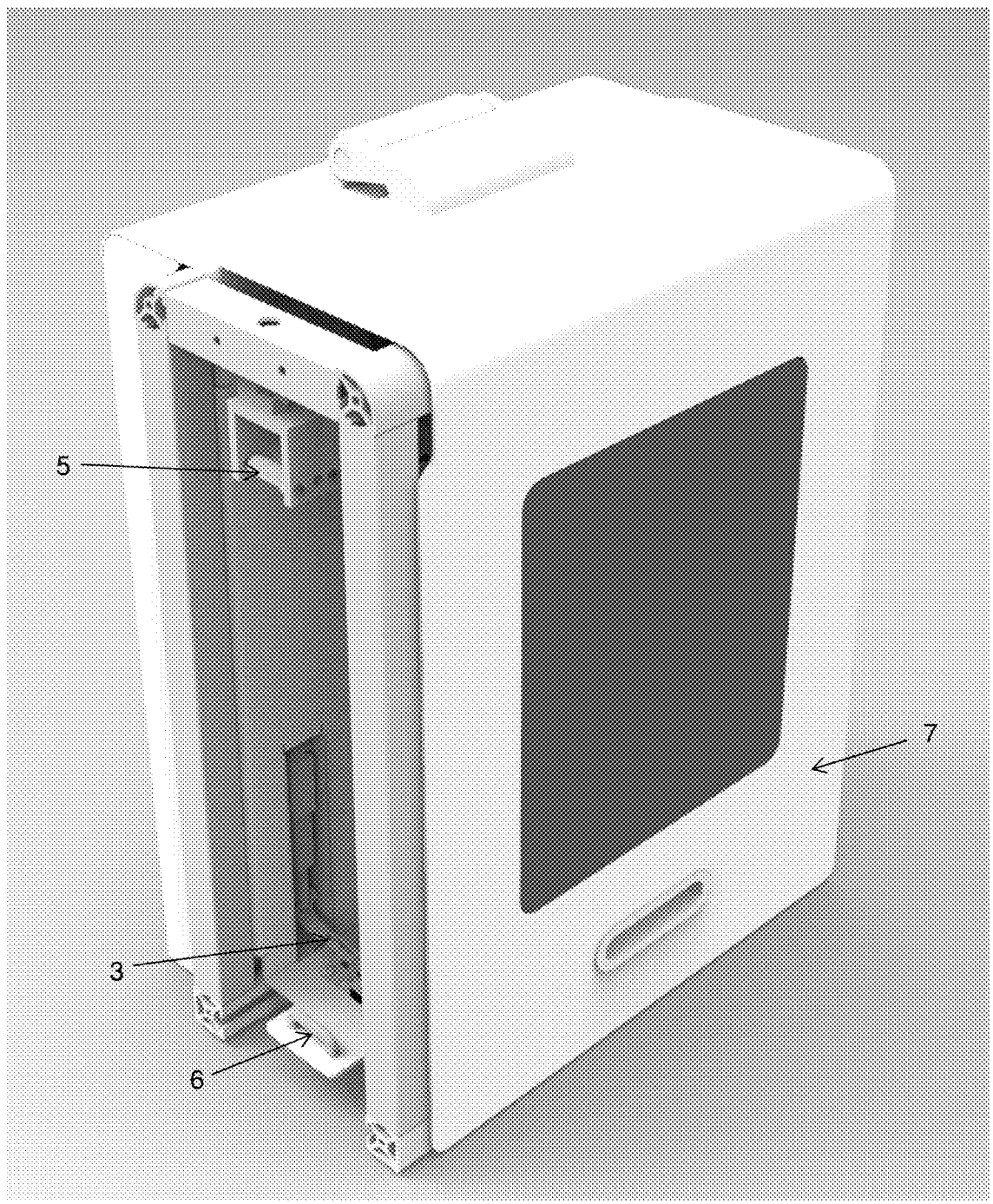
FIG. 2 is a side view of the housing and mounting arrangement for the material to be cut and force measuring means of FIG. 1.

FIG. 2 is a side view of the housing containing the mounting arrangement for the strip material and load cell. FIG. 2 does not show the strip material but, in use, the strip material extends between two guides 5 and 6. Part of the anchor 3 can be seen in FIG. 2. Also in FIG. 2 a cover 7 is in place over the housing. When the strip material is in place between spools 2, load cell 4, the guides 5 and 6, and anchor 3, the sharpness of a blade may be tested by bringing the blade into contact with the material and measuring the resulting force on the material.

A control system (not shown) is provided to control the blade sharpness testing system. In some embodiments, the control system is provided inside the housing. The control system may include a microcontroller, microprocessor, computer controller or any other suitable controller. The control system is adapted to control the blade sharpness testing system without the need for the blade sharpness testing system to include a carriage on which a blade to be tested is mounted or other blade holding and moving device. This means that the blade sharpness testing system may not provide any information to the control system about the position and movement of the blade. Movement of the blade may be controlled independently of the blade sharpness testing system by a blade controller.

Figure 3:
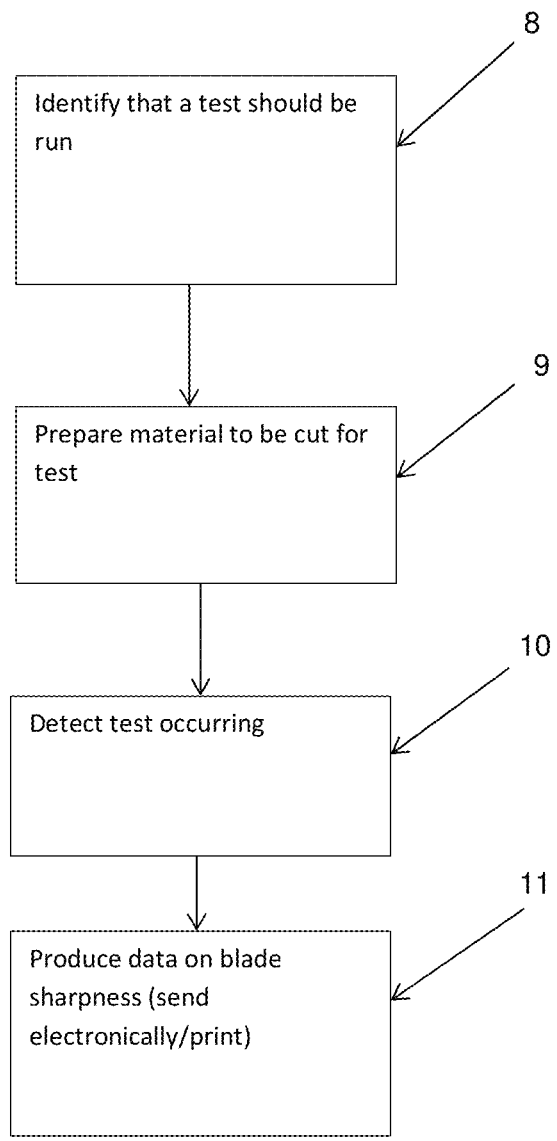
FIG. 3 is a flow chart showing operation of a control system.

FIG. 3 is a flow chart showing operation of the control system. In the first box, 8, the control system identifies that a test should be run. This identification may be a signal from an external source or may be a signal from a blade controller. For example, if the blade is being controlled by a device independently of the blade sharpness testing system, that device may provide a signal to the control system when it is desired to carry out a blade sharpness test. In another example, if the blade is being held by a person, the person may push a button to indicate that they wish to perform a blade sharpness test.

When the system has identified that a test should be run the strip material is prepared for the test (box 9). In the device shown in FIGS. 1 and 2 the strip material is prepared by rolling an uncut section of the strip material to between the guides 5 and 6 (labelled in FIG. 2) and tensioning the strip material to a predetermined tension and clamping it using anchor 3 to hold the strip material tight. In one example the strip material is tensioned to 2 kg.

The blade controller then brings the blade into contact with the strip material. The blade is moved through the strip material to cut the material and continue cutting along the length of the blade. If the strip material is mounted substantially vertically, as is shown in FIG. 1, and the blade is oriented substantially vertically with the cutting edge facing downwards, then the blade is moved an a downwards angle through the material by the blade controller so that all of the blade cuts the material. The load cell measures the force on the material throughout the cutting action. The amount of force measured by the load cell is related to the sharpness of the blade. Sharper portions of the blade will cut more easily though the material then blunter portion of the blade. The harder it is to cut though the material the more force is required for the cut and this is measured by the load cell.

When the blade first contacts the strip material the tension on the strip material increases and this increased tension is detected by the load cells and identified as the start of the test by the control system (box 10). As the blade continues to cut the material the tension is measured by the load cell(s) and this measurement is sent to the control system.

In some cases, the blade may be controlled by a robotic device separate to the blade sharpness testing system. This robotic device will send a signal to the control system when a blade sharpness test is to be performed. The robotic device may also send a blade position signal to the control system during the test. The blade position signal may be sent to the control system at predetermined intervals. If the blade position signal indicates that the blade hasn't moved for the period of time, then the control system may determine that the blade sharpness test is complete.

Alternatively, the control system may receive a signal that the test is complete, for example a person holding the blade may push a button when the test is completed. As another alternative, the control system may determine that a test is completed when there has been no change in the tension on the strip material for a predetermined period of time.

Figure 4:
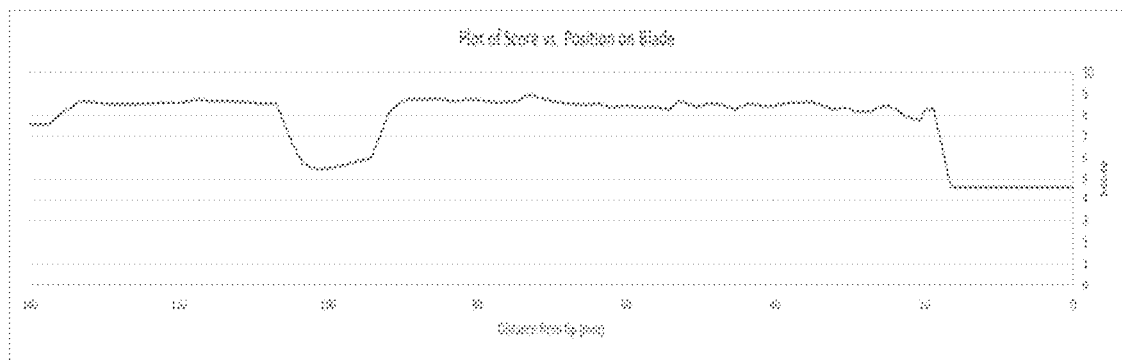
FIG. 4 is a graph showing a sharpness score against position on the blade.

After the test has been completed, the control system produces data on the sharpness of the blade that was tested. This data may be in the form of position along the blade and peak score, an example of which is shown in FIG. 4. If position information is provided to the control system, then the control system can use this information to provide sharpness data based on the force measurement and position data. If the speed of the blade is known during the test this can also be used to provide sharpness data based on the force measurement and the speed information. If position and speed information are not known but test start and stop times are known along with blade length, then this information can be used (along with the force measurement) to provide sharpness data.

The control system may also detect if the force on the strip material exceeds a predetermined level or is above threshold conditions. If this occurs, then the test is aborted. If the blade is controlled by a robotic device, then the control system may send a signal to the robotic device that the test is aborted. The above threshold conditions may occur, for example, when a portion of the blade is not sufficiently sharp. This may be caused by the sharpening system being out of calibration, having worn sharpening stones or some other error in the sharpening process.

In one example the blade is controlled by a robotic device that sharpens the blade. After performing a sharpening operation, it is desired that the sharpness of the blade is tested. The robotic device sends a signal to the control system that a blade sharpness test is needed. In response to the signal the control system prepares the blade sharpness testing system for the test. This preparation includes ensuring that a section of strip material is in position for the test and is tensioned to the pre-test tension level. The robotic device also sends position information to the control system so that the control system knows the position of the blade. When the blade contacts the strip material the force on the strip material increases. This increase in force is measured by a load cell in the blade sharpness testing system and detected by the control system. The control system then knows that the test has started. When the position information indicates that the blade has stopped moving or that the heel of the blade has contacted the strip material this indicates to the control system that the test has ended. The control system then uses the force readings and the blade position information to determine the peak sharpness of the blade. The peak sharpness information is sent back to the robotic device. The robotic device can then use this information to adjust the next sharpening of the blade or to determine that the blade is sufficiently sharp.

Communication between the control system and the robotic device can be by any suitable means, either wired or wireless.

FIG. 4 is a plot of a blade sharpness score against blade position. As the blade is tested the force of the blade on the strip material is measured along the length of the blade. This force is then converted into a score for each point along the blade with a higher score meaning a sharper point on the blade than a lower score. As can be seen in FIG. 4 on this blade there are two areas on the blade that are blunter than the rest of the blade. At about 100 mm from the tip of the blade there is an area of relative bluntness. The area at the tip of the blade is also relatively blunt. If this information is provided to the device controlling the blade, then relatively blunt areas on the blade can be sharpened. The sharpness of the blade can then be retested.

The invention claimed is:

1. A system for testing blade sharpness comprising:
a mounting arrangement mounting a strip material to be cut, such that the strip material is under tension;
a force measuring device operating to determine variations in force along different parts of a blade as those parts of the blade contact the strip material;
a control system operating to:
ensure the strip material is tensioned to a pre-test tension level;
cause the blade to move along a longitudinal dimension of the strip material to cut the strip material in that dimension; and
provide an indication of the force of the blade on the strip material along the different parts of the blade, wherein the strip material is in the form of a tape held under tension between powered spools.

2. The system according to claim 1, wherein:
the mounting arrangement comprises powered spools;
the material consists of a tensioned tape; and
the force measuring device determines the sharpness of a blade by measuring tension on the tape.

3. The system for testing blade sharpness as claimed in claim 1, wherein the tape is in the form of a mesh.

4. A system for testing blade sharpness according to claim 1, comprising an anchor and the strip material is tensioned between the anchor and the force measuring device.

5. The system according to claim 4, wherein the force measuring device comprises a load cell or a strain gauge.

6. The system for testing blade sharpness according to claim 1, wherein:
the strip material consists of a tensioned tape; and
the force measuring device determines the sharpness of the blade by measuring tension on the tape.

7. The system for testing blade sharpness according to claim 6, wherein the control system:
aborts the test when pre-determined force levels are exceeded;
receives a signal that a blade sharpness test is to be performed from a blade controller independent of the blade sharpness testing system;
sends and receives signals from the blade controller;
receives position information from the blade controller; and
provides an indication of force on the blade as a peak sharpness measure.

8. The system for testing blade sharpness as claimed in claim 1, wherein the blade is at an angle as it cuts the strip material in the longitudinal dimension such that substantially all of the blade cuts the strip material.

9. The system for testing blade sharpness as claimed in claim 8, wherein the tape is in the form of a mesh.

10. The system for testing blade sharpness as claimed in claim 8, wherein the control system is adapted to receive information as to the position of the blade from a blade controller.

11. The system for testing blade sharpness as claimed in claim 10, wherein the control system provides the indication of force on the blade as a peak sharpness measure.

12. A system for sharpening and testing blade sharpness comprising:
a mounting arrangement comprising powered spools mounting a strip material to be cut such that the strip material is under tension between the spools; and
a force measuring device operating to determine variations in force along
different parts of a blade as those parts of the blade contact the strip material, the system characterized in that it further comprises:
a robotic device that sharpens the blade; and
a control system operating to:
receive a signal from the robotic device, after a sharpening operation has been performed on the blade, that a blade sharpness test is to be performed on the blade;
in response to the signal, prepare the mounting arrangement for the blade sharpness test by ensuring a section of the strip material to be cut is in position for the test and tensioned between the spools to a predetermined level;
determine when the blade contacts the strip material by detecting an increase of tension on the strip material and to identify this as the start of a blade sharpness test;
cause the blade to move along a longitudinal dimension of the strip material to cut the strip material in that dimension;
receive position information for the blade from the robotic device, so that the control system knows the position of the blade;
detect when force on the strip material associated with contact by the blade rises above a pre-determined level and, if the pre-determined level is exceeded, to cause the blade sharpness test to be aborted;
detect when the blade sharpness test is completed, based at least in part on the position information; and
provide an indication of the force of the blade on the strip material for the different parts of the blade and communicate the indication of the force of the blade to the robotic device; and
wherein the robotic device uses the indication of force of the blade on the material for different parts of the blade to adjust how it next sharpens the blade or to determine that the blade is sufficiently sharp.

13. The system as claimed in claim 12, wherein the control system receives the signal that the blade sharpness test is to be performed from a blade controller independent of the blade sharpness testing system.

14. The system as claimed in claim 12, wherein the control system provides the indication of force on the blade as a peak sharpness measure.

* * * * *